United States Patent
Xu et al.

(10) Patent No.: US 11,030,476 B2
(45) Date of Patent: Jun. 8, 2021

(54) SYSTEM AND METHOD FOR DETECTING AND TRACKING OBJECTS

(71) Applicant: ELEMENT AI INC., Montreal (CA)

(72) Inventors: Anqi Xu, Montreal (CA); Joel Lamy-Poirier, Montreal (CA)

(73) Assignee: ELEMENT AI INC., Montreal (CA)

(*) Notice: Subject to any disclaimer, the term of this patent is extended or adjusted under 35 U.S.C. 154(b) by 0 days.

(21) Appl. No.: 16/698,600

(22) Filed: Nov. 27, 2019

(65) Prior Publication Data
US 2020/0175311 A1 Jun. 4, 2020

Related U.S. Application Data

(60) Provisional application No. 62/772,729, filed on Nov. 29, 2018.

(51) Int. Cl.
B60D 1/36 (2006.01)
G06K 9/00 (2006.01)
(Continued)

(52) U.S. Cl.
CPC ............ G06K 9/605 (2013.01); B60R 1/00 (2013.01); G06K 9/00791 (2013.01); G06T 7/73 (2017.01); H04N 7/181 (2013.01); B60R 2300/308 (2013.01); B60R 2300/808 (2013.01); B60T 7/12 (2013.01); B62D 15/025 (2013.01); G06T 2207/10016 (2013.01); G06T 2207/30252 (2013.01)

(58) Field of Classification Search
CPC ............ G06T 7/73; G06T 2207/30252; G06T 2207/10028; G06T 2219/2004; B60R 2300/308; B60R 2300/808; B62D 15/025; G06K 9/00791
See application file for complete search history.

(56) References Cited

U.S. PATENT DOCUMENTS 7,777,615 B2 * 8/2010 Okuda ............... B60D 1/36
                                                 280/477
8,798,842 B2 * 8/2014 Woolf ............... B60D 1/36
                                                 280/479.1
(Continued)

OTHER PUBLICATIONS

Kaneko et al., "Mask-Slam: Robust feature-based monocular SLAM by masking using semantic segmentation", IEEE/CVF Conference on Computer Vision and Pattern Recognition Workshops (CVPRW), 2018, pp. 371-379.
(Continued)

Primary Examiner — Brian P Yenke
(74) Attorney, Agent, or Firm — BCF LLP

(57) ABSTRACT

Methods of and systems for operating an embedded system of a vehicle during a coupling operation of the vehicle with a trailer having a coupler. The method comprises accessing a video stream generated by a video camera; operating an object detection module on the video stream so as to detect the trailer and/or the coupler and establish one or more regions of interest. The method also comprises generating a vehicle referential point estimated position of a vehicle referential point and generating a coupler position with respect to the vehicle referential point estimated position based on the one or more regions of interests and the vehicle referential point estimated position.

17 Claims, 8 Drawing Sheets

(51) Int. Cl.
*G06T 7/73* (2017.01)
*G06K 9/60* (2006.01)
*H04N 7/18* (2006.01)
*B60R 1/00* (2006.01)
*B60T 7/12* (2006.01)
*B62D 15/02* (2006.01)

(56) References Cited

U.S. PATENT DOCUMENTS

| | | | | |
|---|---|---|---|---|
| 8,888,120 B2* | 11/2014 | Trevino | ............ | B60D 1/36 |
| | | | | 280/477 |
| 8,888,121 B2* | 11/2014 | Trevino | ............ | B60D 1/62 |
| | | | | 280/477 |
| 9,296,421 B2* | 3/2016 | Lavoie | ............ | B62D 13/06 |
| 9,710,712 B2* | 7/2017 | Madden | ............ | G06K 9/00771 |
| 9,796,228 B2* | 10/2017 | Hu | ............ | B60Q 5/00 |
| 9,834,140 B2* | 12/2017 | Windeler | ............ | B60R 1/00 |
| 9,854,209 B2* | 12/2017 | Aich | ............ | B60W 10/18 |
| 9,937,953 B2* | 4/2018 | Lavoie | ............ | B62D 15/027 |
| 9,996,753 B2* | 6/2018 | Madden | ............ | G06K 9/00771 |
| 10,017,115 B2* | 7/2018 | Lavoie | ............ | B60R 11/04 |
| 10,035,457 B2* | 7/2018 | Singh | ............ | B60R 1/00 |
| 10,150,505 B2* | 12/2018 | Herzog | ............ | G06K 9/00791 |
| 10,155,478 B2* | 12/2018 | Hu | ............ | B60R 1/00 |
| 10,210,397 B2* | 2/2019 | Madden | ............ | G06K 9/00771 |
| 10,220,839 B2* | 3/2019 | Lavoie | ............ | B60D 1/62 |
| 10,259,390 B2* | 4/2019 | Zhang | ............ | B60R 1/003 |
| 10,266,023 B2* | 4/2019 | Mattern | ............ | B62D 15/0285 |
| 10,363,874 B2* | 7/2019 | Zhang | ............ | G06T 7/13 |
| 10,402,995 B2* | 9/2019 | Kwant | ............ | G06T 7/12 |
| 10,427,716 B2* | 10/2019 | Xu | ............ | B62D 15/0285 |
| 10,427,717 B2* | 10/2019 | Zhang | ............ | B62D 15/0295 |
| 10,435,070 B2* | 10/2019 | Herzog | ............ | B60W 30/18036 |
| 10,471,989 B2* | 11/2019 | Lavoie | ............ | B60W 50/0098 |
| 10,479,152 B2* | 11/2019 | Niewiadomski | ............ | B60D 1/62 |
| 10,543,870 B1* | 1/2020 | Niewiadomski | ............ | B60R 1/003 |
| 10,628,690 B2* | 4/2020 | Herman | ............ | G06T 7/11 |
| 10,630,962 B2* | 4/2020 | Dabeer | ............ | H04N 5/2329 |
| 10,632,803 B2* | 4/2020 | Niewiadomski | ............ | B60R 11/04 |
| 10,632,919 B2* | 4/2020 | Ling | ............ | B60D 1/36 |
| 10,664,706 B2* | 5/2020 | Madden | ............ | G06K 9/00771 |
| 10,733,876 B2* | 8/2020 | Moura | ............ | G06K 9/00785 |
| 10,744,943 B1* | 8/2020 | Jales Costa | ............ | B60R 1/00 |
| 10,755,115 B2* | 8/2020 | Avidan | ............ | G06N 3/0454 |
| 10,769,461 B2* | 9/2020 | Madkor | ............ | G01S 17/86 |
| 2005/0074143 A1* | 4/2005 | Kawai | ............ | B62D 13/06 |
| | | | | 382/104 |
| 2014/0012465 A1* | 1/2014 | Shank | ............ | B62D 15/0285 |
| | | | | 701/36 |
| 2014/0125795 A1* | 5/2014 | Yerke | ............ | B60R 1/00 |
| | | | | 348/118 |
| 2014/0200759 A1* | 7/2014 | Lu | ............ | B60D 1/245 |
| | | | | 701/28 |
| 2014/0309887 A1* | 10/2014 | Lavoie | ............ | G01B 21/22 |
| | | | | 701/41 |
| 2015/0115571 A1* | 4/2015 | Zhang | ............ | H04N 7/183 |
| | | | | 280/477 |
| 2015/0138340 A1* | 5/2015 | Lavoie | ............ | G06K 9/3216 |
| | | | | 348/118 |
| 2015/0149040 A1* | 5/2015 | Hueger | ............ | B62D 15/028 |
| | | | | 701/41 |
| 2016/0039456 A1* | 2/2016 | Lavoie | ............ | B60D 1/62 |
| | | | | 701/41 |
| 2016/0059888 A1* | 3/2016 | Bradley | ............ | B60D 1/245 |
| | | | | 701/41 |
| 2016/0210512 A1* | 7/2016 | Madden | ............ | G06K 9/00771 |
| 2016/0288601 A1* | 10/2016 | Gehrke | ............ | G06K 9/6201 |
| 2016/0375831 A1* | 12/2016 | Wang | ............ | B62D 15/0295 |
| | | | | 348/148 |
| 2016/0378118 A1* | 12/2016 | Zeng | ............ | B60D 1/62 |
| | | | | 701/28 |
| 2017/0174023 A1* | 6/2017 | Hu | ............ | B60D 1/06 |
| 2017/0286778 A1* | 10/2017 | Madden | ............ | G06K 9/00771 |
| 2017/0341583 A1 | 11/2017 | Zhang et al. | | |
| 2018/0001721 A1* | 1/2018 | Huger | ............ | G06T 7/70 |
| 2018/0029429 A1* | 2/2018 | Janardhana | ............ | B62D 15/025 |
| 2018/0061102 A1* | 3/2018 | Goto | ............ | B62D 15/029 |
| 2018/0181142 A1* | 6/2018 | Baran | ............ | G01C 3/10 |
| 2018/0192035 A1* | 7/2018 | Dabeer | ............ | G06T 5/002 |
| 2018/0253106 A1* | 9/2018 | Inui | ............ | B60W 30/0956 |
| 2018/0260633 A1* | 9/2018 | Madden | ............ | G06K 9/00771 |
| 2018/0361929 A1* | 12/2018 | Zhang | ............ | H04N 7/181 |
| 2019/0035101 A1* | 1/2019 | Kwant | ............ | G06N 3/0454 |
| 2019/0092109 A1* | 3/2019 | Carpenter | ............ | G05D 1/0223 |
| 2019/0163983 A1* | 5/2019 | Madden | ............ | G06K 9/00771 |
| 2019/0188505 A1* | 6/2019 | Madkor | ............ | G08G 1/0175 |
| 2019/0258251 A1* | 8/2019 | Ditty | ............ | G05D 1/0274 |
| 2019/0308473 A1* | 10/2019 | Yu | ............ | B60D 1/363 |
| 2019/0335100 A1* | 10/2019 | Chen | ............ | B60R 1/00 |
| 2019/0337343 A1* | 11/2019 | Ramirez Llanos | ...... | B60D 1/36 |
| 2019/0339704 A1* | 11/2019 | Yu | ............ | G06T 7/174 |
| 2019/0340787 A1* | 11/2019 | Ramirez Llanos | .. | G05D 1/0251 |
| 2019/0346856 A1* | 11/2019 | Berkemeier | ........ | G05D 1/0278 |
| 2019/0347498 A1* | 11/2019 | Herman | ............ | G06T 7/11 |
| 2019/0378282 A1* | 12/2019 | Rogan | ............ | G06T 7/251 |
| 2020/0001855 A1* | 1/2020 | Watanabe | ............ | B60W 10/20 |
| 2020/0001920 A1* | 1/2020 | Hejase | ............ | B60W 30/18036 |
| 2020/0031392 A1* | 1/2020 | Lavoie | ............ | B60D 1/245 |
| 2020/0039517 A1* | 2/2020 | Berkemeier | ........ | G05D 1/0225 |
| 2020/0055356 A1* | 2/2020 | Niewiadomski | ........ | B60R 1/00 |
| 2020/0070724 A1* | 3/2020 | Kraftschik | ............ | B60D 1/06 |
| 2020/0073398 A1* | 3/2020 | Niewiadomski | ...... | G05D 1/0094 |
| 2020/0101897 A1* | 4/2020 | Miller | ............ | B60Q 9/008 |
| 2020/0118423 A1* | 4/2020 | Moura | ............ | G06N 3/08 |
| 2020/0130744 A1* | 4/2020 | Niewiadomski | ........ | B60D 1/62 |
| 2020/0175718 A1* | 6/2020 | Viswanathan | ........ | G06T 7/74 |
| 2020/0226377 A1* | 7/2020 | Campos Macias | .. | G06K 9/4628 |
| 2020/0226430 A1* | 7/2020 | Ahuja | ............ | G06K 9/6257 |
| 2020/0242381 A1* | 7/2020 | Chao | ............ | B60W 40/08 |
| 2020/0247471 A1* | 8/2020 | Grodde | ............ | B60W 50/045 |
| 2020/0272847 A1* | 8/2020 | Mittal | ............ | G06T 7/60 |
| 2020/0284607 A1* | 9/2020 | Mangal | ............ | G01C 21/3438 |

OTHER PUBLICATIONS

Microsoft / AirSim, "Open source simulator for autonomous vehicles built on Unreal Engine / Unity, from Microsoft AI & Research", https://github.com/Microsoft/AirSim accessed Apr. 5, 2020, pdf 6 pages.

* cited by examiner

Legend:
400, 420 – Frame
402 – Hitch ball
404 – Coupler
406 – Region of interest
408 – Parked car
410, 412 – Trees

SYSTEM AND METHOD FOR DETECTING AND TRACKING OBJECTS

CROSS-REFERENCE TO RELATED APPLICATIONS

This application claims the benefit of and priority to U.S. Provisional Patent Application No. 62/772,729, filed on Nov. 29, 2018, and entitled "System and Method for Detecting and Tracking Objects," which is incorporated by reference herein in its entirety.

FIELD

The present technology relates to systems and methods for detecting and tracking objects. In particular, the systems and methods allow detection and tracking of trailer and/or coupler from a vehicle's camera feed.

BACKGROUND

Motored vehicles, such as cars or trucks for example, may be used for towing trailers. Such trailers may have various structural configurations depending on their intended purposes. As a first example, a trailer may be configured to receive heavy charges such as containers and/or commercial merchandises. As a second example, a trailer may also be configured to receive smaller charges and/or objects, such as a boat or a recreational vehicle. In order to establish a mechanical connection between a trailer and a vehicle, the trailer typically comprises a coupler bolted and/or welded onto a structural component of the trailer. The coupler extends from the trailer and is configured to connect to a vehicle, for example by being secured to a hitch ball protruding from a rear portion of the vehicle.

Coupling a vehicle and a trailer may be a tedious operation requiring multiple maneuvers aiming a properly aligning the coupler of the trailer and the hitch ball of the vehicle. The difficulty of coupling the vehicle and the trailer may be explained, at least partially, by (1) the relative small size of the coupler and the hitch ball compared to a size of the trailer and vehicle; (2) the lack of direct visibility for the driver of the vehicle given the position of the hitch ball (e.g., beneath a rear bumper of the vehicle); and/or (3) the difficulty of establishing a proper trajectory and refining it as the vehicle approaches the trailer.

Improvements are therefore desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of technological challenges to be overcome in order to provide systems and methods allowing detection and tracking of trailer and/or coupler from a vehicle's camera feed.

In particular, such challenges may comprise (1) detecting a trailer with high accuracy at high distance; (2) detecting and establishing a position of a coupler with high accuracy at medium distance; (3) a limited processing capability of hardware component embedded in the vehicle and/or (4) a need to process vehicle's camera feed in real-time or close to real-time so as for a driver and/or the vehicle to affect a trajectory and/or speed of the vehicle in a timely manner.

In one aspect, various implementations of the present technology provide a method for operating an embedded system of a vehicle during a coupling operation of the vehicle with a trailer having a coupler, the vehicle comprising a video camera, the method comprising:
  accessing a video stream generated by a video camera being oriented so as to have the trailer in its field of view;
  operating an object detection module on the video stream so as to detect the trailer and/or the coupler and establish one or more regions of interests being associated with at least one of the trailer and/or the coupler;
  generating a vehicle referential point estimated position of a vehicle referential point; and
  generating a coupler position with respect to the vehicle referential point estimated position based on the one or more regions of interests and the vehicle referential point estimated position.

In another aspect, various implementations of the present technology provide a system configured to be operated during a coupling operation of the vehicle with a trailer having a coupler, the vehicle comprising a video camera, the system comprising:
  a processor;
  a non-transitory computer-readable medium, the non-transitory computer-readable medium comprising control logic which, upon execution by the processor, causes:
    accessing a video stream generated by a video camera being oriented so as to have the trailer in its field of view;
    operating an object detection module on the video stream so as to detect the trailer and/or the coupler and establish one or more regions of interests being associated with at least one of the trailer and/or the coupler;
    generating a vehicle referential point estimated position of a vehicle referential point; and
    generating a coupler position with respect to the vehicle referential point estimated position based on the one or more regions of interests and the vehicle referential point estimated position.

In another aspect, various implementations of the present technology provide a method for detecting and tracking an object of interest, the method comprising:
  accessing a video stream generated by a video camera being oriented so as to have the object of interest in its field of view;
  detecting the object of interest from a plurality of background objects located in the field of view of the video camera;
  establishing one or more regions of interests being associated with the object of interest;
  generating a first position, the first position being an estimated position of a referential point; and
  generating a second position, the second position being an estimated position of the object of interest with respect to the first position, the second position being generated based on the one or more regions of interests and the first position.

In another aspect, various implementations of the present technology provide a system configured to detect and track an object of interest, the system comprising:
  a processor;
  a non-transitory computer-readable medium, the non-transitory computer-readable medium comprising control logic which, upon execution by the processor, causes:

accessing a video stream generated by a video camera being oriented so as to have the object of interest in its field of view;

detecting the object of interest from a plurality of background objects located in the field of view of the video camera;

establishing one or more regions of interests being associated with the object of interest;

generating a first position, the first position being an estimated position of a referential point; and generating a second position, the second position being an estimated position of the object of interest with respect to the first position, the second position being generated based on the one or more regions of interests and the first position.

In other aspects, various implementations of the present technology provide a non-transitory computer-readable medium storing program instructions for executing detecting and tracking an object of interest, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for executing detecting and tracking an object of interest, the program instructions being executable by the at least one processor of the electronic device to carry out one or more of the above-recited methods.

In the context of the present specification, unless expressly provided otherwise, a computer system may refer, but is not limited to, an "electronic device", an "operation system", a "system", a "computer-based system", an "embedded system", a "vehicle system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
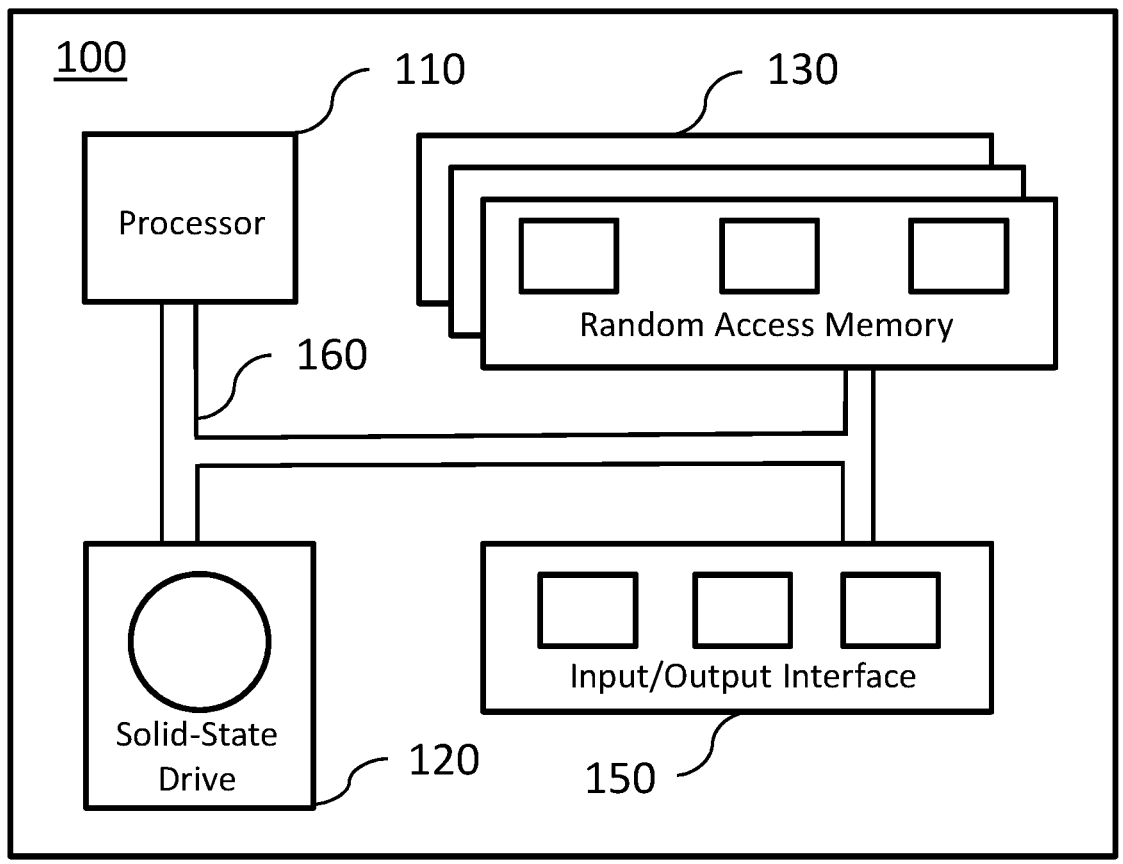
FIG. 1 is a diagram of a computing environment in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP) or a graphics processing unit (GPU). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating embedded software of a vehicle, a controller dedicated to controlling certain functions of a vehicle and/or providing assistance to a driver of the vehicle and/or an augmented reality system dedicated to processing a vehicle's video feed and generating synthetic information superimposed to the vehicle's video feed and/or any combination thereof appropriate to the relevant task at hand.

In some embodiments, the computing environment 100 comprises various hardware components including one or more single or multi-core processors collectively represented by a processor 110, a solid-state drive 120 (which may also include any form of persistent data store device, such as a spinning-disk magnetic hard drive), a random access memory 130 and an input/output interface 150. The computing environment 100 may be a computer specifically designed for operating embedded software of a vehicle so as to, at least partially, control the vehicle and/or provide assistance to a driver of the vehicle. In some alternative embodiments, the computing environment 100 may be a generic computer system.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems of a vehicle. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow receiving data relating to a vehicle's environment, such as presence and position of objects and/or one or more video feeds taken from various angles of the vehicle. As an example, the input/output interface 150 may receive data from, for example but without being limitative, sensor systems, navigation systems, video cameras and/or other embedded systems of the vehicle. In some embodiments, the input/output interface 150 may implement a networking interface allowing communication with other vehicle's systems and/or systems outside the vehicle (e.g., remote servers, mobile devices, etc.). How the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for detecting and/or tracking objects. For example, the program instructions may be part of a library or an application.

Figure 2:
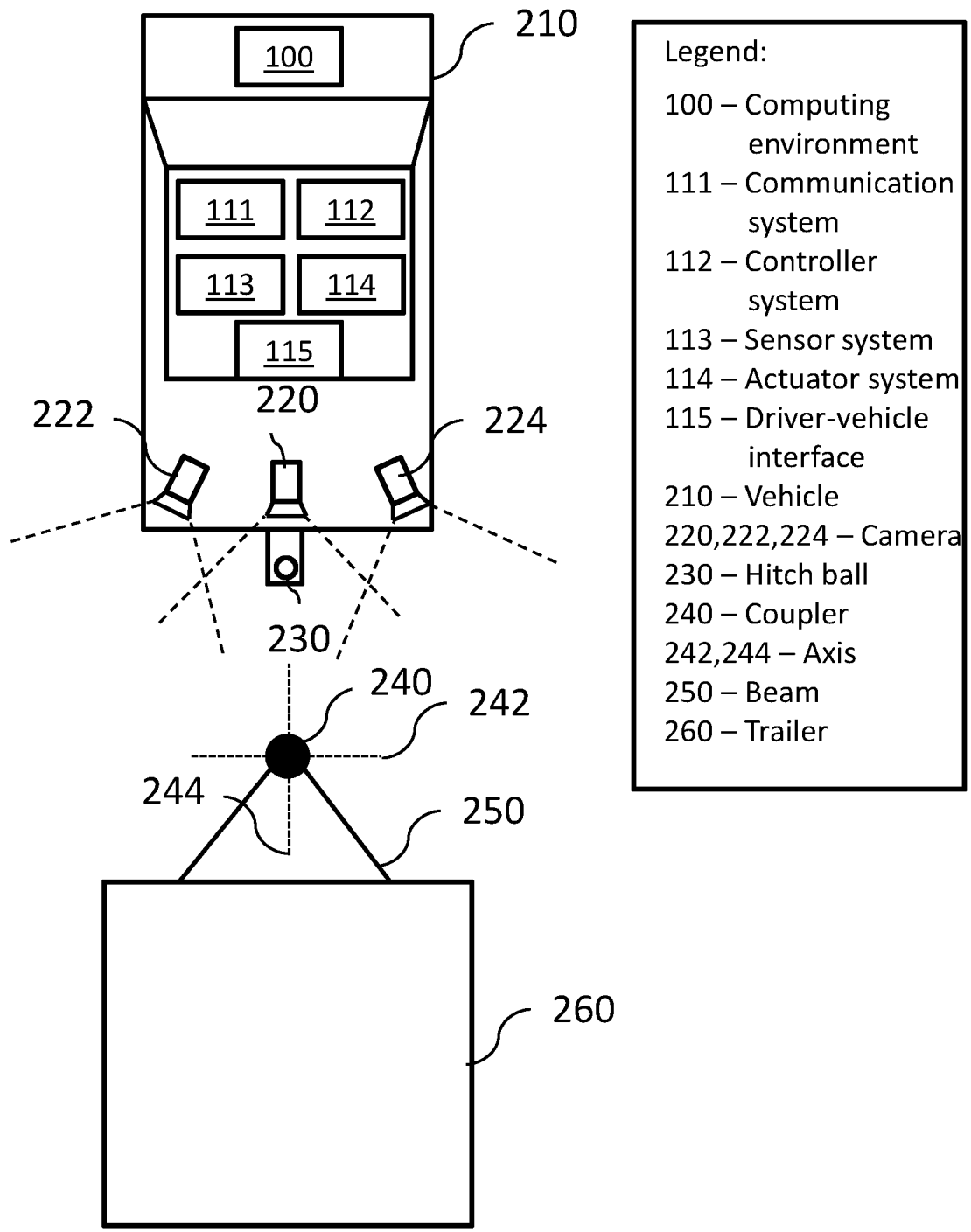
FIG. 2 is a diagram illustrating a vehicle and a trailer engaged in a coupling operation in accordance with embodiments of the present technology.

Referring to FIG. 2, a top view of a vehicle 210 and a trailer 260 engaged in a coupling operation is depicted in accordance with embodiments of the present technology. The vehicle 210 may be a car, a truck or any type of motored vehicle allowing towing of the trailer 260. The vehicle 210 may comprise an imaging system comprising one or more video cameras, such as video cameras 220, 222 and 224. The number and configuration of the video cameras 220, 222 and 224 may vary and is not limitative. In some embodiments, one or more of the video cameras 220, 222 and 224 may take the form of CCD and/or CMOS cameras, either greyscale or RGB. Other types of cameras may also be considered such as, without being limitative, infrared cameras, light field cameras, event cameras, standalone depth cameras and/or RGB+depth cameras. In some embodiments the video cameras 220, 222 and 224 may be characterized by their output which may be, or which may be transformed into (e.g., in the case of event camera), a sequence of 2-dimensional images with one or more channels (e.g., in the case of color or depth channels).

The vehicle 210 also comprises a coupling component allowing mechanical coupling of the vehicle with a trailer. In some embodiments, the coupling component comprises a hitch ball 230 connected to a structural component of the vehicle 210 (e.g., a chassis of the vehicle 210). The hitch ball 230 extends rearwardly and along a longitudinal axis of the vehicle 210. The coupling component may be implemented in various ways depending on various factors such as, the type of mechanical system implementing a coupling function and/or mechanical constraints the coupling component has to withstand. Various implementations may be therefore envisioned without departing from the scope of the present technology.

The vehicle 210 may also comprise a computing environment 100. The computing environment 100 may be part of or define the embedded electronic system of the vehicle 210. The embedded electronic system of the vehicle 210 may comprise a communication system 111, a controller system 112, a sensor system 113, an actuator system 114 and a driver-vehicle interface 115. The driver-vehicle interface 115 may comprise one or more screens and/or video projecting system (e.g., a heads-up display) allowing a video feed generated by the video cameras 220, 222 and 224 to be displayed to a driver and/or a passenger of the vehicle 210. As it will become apparent to the person skilled in the art of the present technology, the vehicle 210 may also comprise a propulsion system, a transmission system, a steering system and a brake system.

In some embodiments, the sensor system 113 may comprise a variety of sensors such as the imaging system comprising video cameras 220, 222 and 224. The sensor system 113 may also comprise radars, lidars, thermal cameras, ultrasonic sensors, speed sensors, steering sensors, trajectory sensors and/or vehicle's position or configuration sensors. The various sensors of the sensor system 113 may be interconnected and feed the computing environment 100 with data relating to an exterior environment and/or an interior environment of the vehicle 210.

In some embodiments, the computing environment 100 relies on data gathered from the sensor system 113 to control, at least partially, the vehicle 210 and/or provide assistance to the driver of the vehicle 210 based on a detection and tracking of a coupler of a trailer in accordance with embodiments of the present technology. As an example which will further be discussed below, the computing environment 100 may generate synthetic images to augment a video feed generated by the video cameras 220, 222 and 224 to assist a driver in a maneuver aiming at coupling the vehicle 210 with the trailer 260. Such assistance may involve generating graphical representations of a 3-dimensional position of a coupler of a trailer, a 3-dimensional position of a center of a coupler of a trailer, a 3-dimensional position of the hitch ball of the vehicle, a trajectory, a distance and/or a speed of the vehicle 210 resulting in an augmented video feed displayed to the driver for example via one more display of the driver-vehicle interface 115. In alternative embodiments, the computing environment 100 may enable partial or total control of the vehicle 210 during a coupling maneuver based on a detection and tracking of a coupler of a trailer.

Still referring to FIG. 2, the trailer 260 comprises a coupler 240 connected to one more beams 250 bolted and/or welded onto a structural component of the trailer 260. The coupler 240 may be implemented in various ways depending on various factors such as, the type of mechanical system implementing a coupling function and/or mechanical constraints the coupling component has to withstand. The coupler 240 may, for example, but without being limitative, have a cylindrical shape, a spherical shape and/or a cubic shape. Various implementations may be therefore envisioned without departing from the scope of the present technology.

Figure 3:
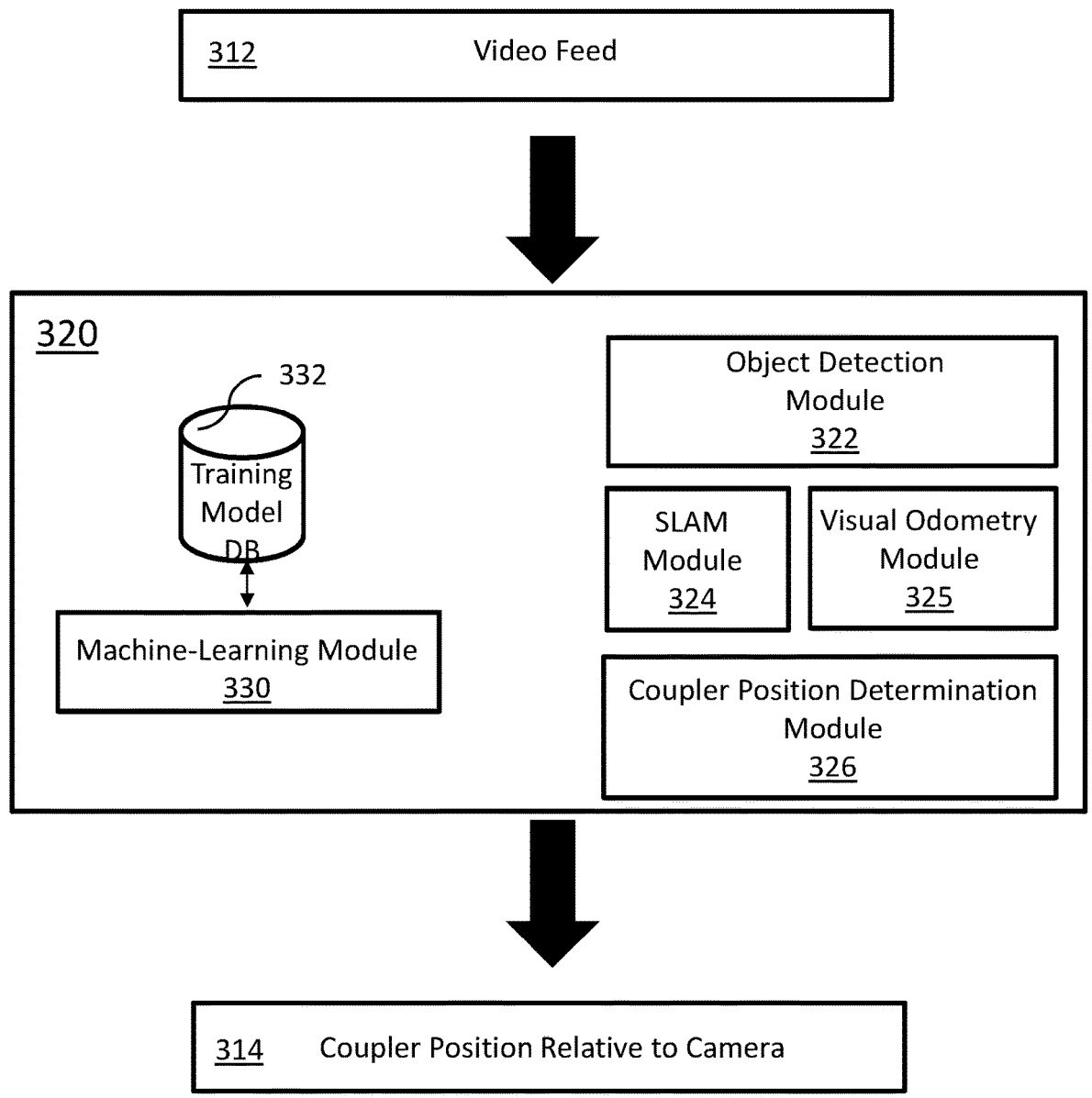
FIG. 3 is a diagram illustrating a system for detecting and tracking a coupler in accordance with embodiments of the present technology.

Referring to FIG. 3, an exemplary embodiment of a system for detecting and tracking a coupler 320 is depicted. In some embodiments, the system 320 may be implemented as a computing environment, such as the computing environment 100, running one or more software modules. In the illustrated, the system 320 comprises an object detection module 322, a simultaneous localization and mapping (SLAM) module 324, a visual odometry module 325, a coupler position determination module 326 and a machine-learning module 330 connected to a training model database 332.

In the illustrated embodiment, the system 320 accesses one or more video feeds (e.g., from video cameras 220, 222 and 224) to generate data allowing establishing a position of the coupler 230 relative to one or more video cameras. To ease the reading of the present description, reference will be made to position of a coupler relative to a video camera even though multiple video cameras may be involved in the process. The data allowing establishing a position of the coupler 230 may be used to control, at least partially, the vehicle 210 and/or provide assistance to the driver of the vehicle 210 during a maneuver aiming at coupling the vehicle 210 and the trailer 260. In some embodiments, the data establishing a position of the coupler 230 may be used to generate graphical representations of a 3-dimensional position of a coupler of a trailer, a 3-dimensional position of a center of a coupler of a trailer, a 3-dimensional position of the hitch ball of the vehicle, a trajectory, a distance and/or a speed of the vehicle. The graphical representations may then be displayed to the driver, for example via one more display of the driver-vehicle interface 115.

In some embodiments, the video feed (also refers to a video stream) may be generated and transmitted to the system 320 by the one or more video cameras 220, 222 and 224. The video stream may be a single uncompressed red, green, blue (RGB) video stream with a resolution of 1920× 1080 @ 30 fps. In alternative embodiments, the resolution may be higher or lower and the fps may be higher or lower. In yet alternative embodiments, the video stream may be a greyscale video stream. In some embodiments, the one or more video cameras 220, 222 and 224 have a field of view of about 100 degrees. In some embodiments, a depth of the video stream may be fixed-point 8-bit or 16-bit depth coding per pixel or as inverse-depth pixel-wise-fixed-point disparity map). In some embodiments, a lens of the one or more video cameras does not produce any (or only little) distortion. In alternative embodiments, the one or more video cameras may comprise a fisheye and/or produce some amount of distortion. In some embodiments, the system 320 and/or the one or more video cameras 220, 222 and 230 may execute a preprocessing on the video stream, for example but without being limitative, so as to augment contrast in dark regions around a coupler visible on the video stream.

In some embodiments, the object detection module 322 executes a model looking for a trailer and a coupler in the video stream to establish one or more regions of interests being associated with the trailer and/or the coupler. In some embodiments, a region of interest may be implemented as a bounding box (axis-aligned, or alternatively, rotated) surrounding, at least partially, the trailer and/or the coupler. In some embodiments, the object detection module 322 executes a deep neural network algorithm. The steps of looking for the trailer and the coupler may be focused on a central portion of the video stream. The object detection module 322 allows detecting a trailer with high accuracy at long distance and the coupler with high accuracy at medium distances. In some embodiments, long, medium, short and very short distances may be defined a distance between a video camera generating the video feed and a trailer and/or a coupler associated with the trailer. In some embodiments, long distance may be defined as up to about 10 meters, medium may be defined as up to about 5 meters, short distance may be defined as up to about 2.5 meters and very short distances may be defined as up to about 1 meter. Other variations as to how distances may be defined are also envisioned.

The object detection module 322 relies on processing of one or more region of interests in the video feed to look for target objects amongst a large set of bounding box proposals (e.g., thousands of proposals). In some embodiments, an object detection model executed by the object detection module 322 may be selected amongst Faster R-CNN, MobiletNet and/or You only look once (Yolo). The Faster R-CNN may comprise a region proposal network (RPN) for generating region proposals and a network using these proposals to detect a trailer and/or a coupler. In some embodiments, the model may be trained for example via the machine-learning module 330 and stored in the training model database 332. Multiple models may be created based on different set of training data and used in-production and/or further optimized based on real-life video feeds. In some embodiments, the training data may comprise real-life data covering different conditions with different trailers in different locations. The training data may also comprise synthetic data and apply style transfer models so as to harmonize the training data and avoid undue biases due to the presence of synthetic data in the training data. Publicly available datasets such Pascal VOC and/or Imagenet may be used as negative data to limit overfitting of the one or more models and reduce false detections.

In some embodiments, the object detection module 322 may also implement additional algorithms aiming at further refining/improving detection of objects. Those additional algorithms may be based on one or more of the solutions discussed in the publication "TinyYolo: YOLOv3: An Incremental Improvement", the publication "Tiny SSD: A Tiny Single-Shot Detection Deep Convolutional Neural Network for Real-time Embedded Object Detection", "MobileNetV2: Inverted Residuals and Linear Bottlenecks" and/or the publication "StressedNets: Efficient Feature Representations via Stress-induced Evolutionary Synthesis of Deep Neural Networks", all of which are hereby included by reference (in jurisdiction allowing such inclusion).

In some embodiments, a running time of the object detection module 322 may be improved by detecting the trailer and/or the coupler with one or more detection models at a low fps and then propagate detections with a statistical model that interpolates between object detection key frames in order to cover the whole fps. Alternatively or in parallel, a model for object tracking can be used to also improve a running time of the object detection module 322. Some examples of tracking models include the GOTURN deep-learning-based architecture, see publication "Learning to Track at 100 FPS with Deep Regression Networks" hereby included by reference (in jurisdiction allowing such inclusion), or the feature-based CMT feature-based model, see publication "Clustering of static-adaptive correspondences for deformable object tracking" hereby included by reference (in jurisdiction allowing such inclusion). Such tracking models take a given "template" image from a prior camera frame, and searches for the template object's bounding box within the current camera frame.

In some embodiments, propagating detections may be based, for example but without being limitative, on a speed of displacement of the vehicle and/or a direction of displacement of the vehicle. In some embodiments, the statistical model may comprise one or more Bayesian filters or deep recurrent network. In some embodiments, one or more tracking algorithms may be used in combination with one or more Bayesian filters for extrapolation allowing covering the whole fps.

In some embodiments, the SLAM module 324 executes a model allowing (1) tracking of a pose of the video camera generating the video stream (e.g., one or more of the video cameras 220, 222 and 224) and (2) building a map of an environment using one or more visual cues from the video stream. In some embodiments, the pose may refer to a Cartesian position and an orientation. In such embodiments, the SLAM module 324 may estimate the camera's 6 degrees of freedom (DOF) pose. In some embodiments, the built map is a simplified map of the environment. In some embodiments, the model executed by the SLAM module 324 generates a 6 DOF pose, including a 3-dimensional Cartesian position and a 3-dimensional orientation. A description of the 3-dimensional visual landmarks may also be generated. In some embodiments, the description of the 3-dimensional visual landmarks may take the form of a series of numbers (vector) and may give low-level details of tracked objects. In some embodiments, the description may be used to determine whether one more 3-dimensional visual landmarks are part of the coupler. In some embodiments, the SLAM module 324 may start gathering data while the video camera is positioned at a long distance from the coupler and is able to provide a reliable map once the video camera is positioned at a medium distance from the coupler.

In some embodiments, the SLAM module 324 is implemented based on ORB-SLAM2. Other implementations of SLAM algorithms may be envisioned without departing from the scope of the present technology. In some embodiments, the SLAM module 324 executes a series of steps enabling a feature detector. A first step comprises executing a feature detector which (1) finds points of interest in each image of a sequence of images from the video stream and (2) generate a feature descriptor summarizing basic properties associated with the points of interests. In some embodiments, the feature detector may be based on a SIFT approach, see publication "Distinctive Image Features from Scale-Invariant" hereby included by reference (in jurisdiction allowing such inclusion); a SURF approach, see publication "SURF: Speeded Up Robust Features" hereby included by reference (in jurisdiction allowing such inclusion); an ORB approach, see publication "ORB: an efficient alternative to SIFT or SURF" hereby included by reference (in jurisdiction allowing such inclusion); a LIFT approach, see publication "Learned Invariant Feature Transform" hereby included by reference (in jurisdiction allowing such inclusion); or a SuperPoint approach, see publication "SuperPoint: Self-Supervised Interest Point Detection and Description" hereby included by reference (in jurisdiction allowing such inclusion). As a result, detector-descriptor pair is designed so that their output is independent of a point of view, i.e., a 3-dimensional object (e.g., a 3-dimensional structure, such as a corner of an object) always leads to a same feature and may be tracked for the duration of the video stream. A second step comprises executing a matching algorithm associating similar features in consecutive frames of the video stream. Once a feature has been seen in several frames, it may be "tracked", i.e., registered as an important visual landmark within the current vicinity that appear across multiple camera frames. The feature may then be tracked as long as it keeps matching a corresponding feature in subsequent frames of the video stream. When a feature can no longer be seen for some time, then it may be deemed as lost and no longer within the current vicinity. In some embodiments, the feature detector is configured to output about 5,000 features. In some alternative embodiments, the feature detector is configured to output about 1,000 features.

In some embodiments, the SLAM module 324 may rely on the set of tracked features to produce a map of an environment consisting of the 3-dimensional positions of the tracked visual landmarks within the current vicinity. The map may be defined with respect to a fixed local coordinate frame that may be arbitrarily centered around an initial camera pose. By associating 2-dimensional tracked image features with their 3-dimensional estimated positions in the map, it becomes possible to localize the 6-Degrees-of-Freedom (DOF) poses (i.e. 3-dimensional position and 3-dimensional orientation). The SLAM module 324, during an initialization phase, may wait to detect enough tracked landmarks to produce a sufficiently accurate map of the environment (which may be established once a sufficient number of tracked landmarks is reached). Once a tracking threshold is reached, the SLAM module 324 may be deemed to have been initialized and may then generate a map and also estimate poses of recent frames from the video camera. In some embodiments, the tracking threshold may vary depending on an acceptable accuracy.

Once the SLAM module 324 has been initialized, a 3-dimensional tracking phase may start. For each new frame of the video stream, the SLAM module 324 may use the newly-updated set of tracked features to estimate the pose of the current camera frame and thus update the estimated position of the video camera. The map may also be updated at the same time. It should be noted that at each frame, some of the tracked visual landmarks may be added or lost. It may happen that too many landmarks may be lost, in which case the SLAM module 324 may no longer be able to track the position of the video camera. Under such circumstances, the SLAM module 324 may execute a relocalization routine. Alternatively, the SLAM module 324 may reinitialize itself by deleting the generated map and relaunching the initialization phase.

In some embodiments, the SLAM module 324 may only predict coordinate up to a scale. Intrinsic parameters may be provided to remove distortions that may be present in one or more image of the video stream. In some embodiments, the SLAM module 324 may operate routines to disambiguate the scale, for example but without being limitative, based on known objects and corresponding sizes of the known objects (e.g., a size of an identification plate, a size of a trailer).). In other embodiments, a separate monocular depth estimation model may be used to estimate a depth of particular landmarks in order to disambiguate scale. Such a depth model may have been trained previously on datasets containing similar-looking scenes and/or objects, but also with ground-truth depth maps obtained from depth cameras or lidar, see publication "Evaluation of CNN-based Single-Image Depth Estimation Methods" hereby included by reference (in jurisdiction allowing such inclusion).

In some embodiments, the SLAM module 324 is configured so as to deliver an acceptable compromise between performance and reliability (for real-time or close to real-time execution) and acceptable level of accuracy of 3-dimensional coordinate estimation. In some embodiments, this is achieved by configuring the feature detector of the SLAM module 324 so that it outputs fewer but more relevant features in less time. A number of features directly impacts a computational time of subsequent steps. More relevant features are more likely to lead to useful tracks, so fewer of them are needed. Selecting a fast detector-descriptor pair also allows reducing computational time of the feature detection.

In some embodiments, selecting more relevant features may be achieved by selecting features so as to have a relative uniform density of features. Less relevant features having a lower intensity may be filtered out from dense regions (in terms of number of features). The filtering out may be based on a K-D Tree approach. In some embodiments, additional routines may also be executed such as a routine implementing a semantic segmentation approach so as to avoid tracking sky for example and focus on more useful regions. An example of implementation of a segmentation approach may be Mask-SLAM (such as described in publication "Mask-SLAM: Robust feature-based monocular SLAM by masking using semantic segmentation" from Masaya Kaneko et al.). In some alternative embodiments, additional routines may also comprise boosting a feature density around the coupler, for example by tuning the feature detector of the SLAM module 324 within a region where the object detection module 322 has identified a coupler. In some other embodiments, certain types of specialized feature detectors may be used, which have been engineered built-in to ignore poorly-tracked points and detect only a small set of stable and salient feature points that lead to great tracking performance. An example of this approach may be found in the SuperPoint deep network feature detection model described in the publication "SuperPoint: Self-Supervised Interest Point Detection and Description" hereby included by reference (in jurisdiction allowing such inclusion).

In some embodiments, the SLAM module 324 may be configured so as to operate on some but not all of the frames of the video stream. As an example, an update rate of the SLAM module 324 may be reduced (e.g., to 1-2 fps) and extrapolation routine may be executed for the remaining frames of the video stream. In some embodiments, the update rate of the SLAM module 324 may be dynamically adjusted so to properly complete an initialization phase and tracking of the features. In some embodiments, proper configuration of the SLAM module 324 may be achieved based on video streams associated with known video camera intrinsic parameters. In some embodiments, the SLAM module 324 may be trained for example via the machine-learning module 330, for example in order to improve a configuration of the semantic segmentation routines. The training by machine-learning module 330 may result in one more trained models associated with optimized hyper parameters which may then be stored in the training model database 332.

In some embodiments, the visual odometry module 325 may be operated instead of the SLAM module 324. In yet other embodiments, the SLAM module 324 and the visual odometry module 325 may be operated in parallel and/or in a complementary manner so as to improve performances and/or accuracy. In some embodiments, the visual odometry module 325 may execute routines allowing identification and tracking of apparent motion of objects between frames of the video stream. The visual odometry module 325 may allow matching up 2-dimensional points, either feature points or even raw pixels, and matching pairings of these 2-dimensional points across 2 consecutive camera frames based on similar appearance or feature descriptor values.

Each appearance-based point matching may have an associated 2-dimensional image-space translation. A statistical algorithm may be used to estimate the underlying 3-dimensional translation and/or rotation transform that would most consistently result in these pairs of 2-dimensional point-to-point translations. As an example, but without being limitative, the statistical algorithm may implement a routine such as RANSAC, for example a routine implementing the approach described in "Random Sample Consensus: A Paradigm for Model Fitting with Applications to Image Analysis and Automated Cartography" from Martin A. Fischler et al.

In yet other embodiments, a module implementing a neural network and trained on training data may be used in replacement of or in addition to the SLAM module 324 or the visual odometry module 325. Operation of such module may allow establishing 3-dimensional positions of 3-dimensional visual landmarks and/or 3-dimensional position of the video camera.

In some embodiments, the coupler position determination module 326 executes a model that allows combining outputs of the object detection module 322 and/or the SLAM module 324 and/or the visual odometry module 325 so as to generate an estimated 3-dimensional position of the coupler relative to the video camera. It should be understood that even though reference is made to a position of the coupler relative to the video camera, this should not be construed as being limitative as it could be equally feasible to establish the position of the coupler relative to the vehicle or a given part of the vehicle (e.g., establishing the position of the coupler of the trailer relative to the hitch ball of the vehicle). As the position of the video camera with respect to the vehicle is known, extrapolations may be conducted to establish a referential position different from the position of the video camera.

As a first step, the coupler position determination module 326 may identify which of the 3-dimensional visual landmarks belong to the coupler. The determination may be based on bounding boxes generated by the object detection module 322 and/or heuristic algorithm and/or description of features generated by the SLAM module 324. As an example, but without being limitative, the heuristic algorithm may implement a routine such as RANSAC-based points-to-parameterized-sphere matching. In some embodiments, when a matching of 3-dimensional points (a.k.a., a point cloud) to either another point cloud "map" or a palatized 3-dimensional shape, an Iterative Closest Point (ICP) algorithm may be used. This algorithm may take as input an initial guess between the relative positioning of the two sets of 3D points/shape, and then iteratively tries to solve for the maximum-likelihood local transform (translation, rotation, and sometimes scaling) such as to decrease the total point-to-nearest-point or point-to-surface distance. That is the «closest point» part of this «iterative» algorithm. Once ICP terminates, determination may be made as to which set of points among the visual landmarks are closest to now-translated-and-rotated parameterized coupler ball sphere model.

As a second step, the coupler position determination module 326, based on the 3-dimensional visual landmarks determined as belonging to the coupler, generate an estimation of a center of the coupler. As an example, the center may be determined an intersection of the axis 242 and 244 shown on FIG. 2. In some embodiments, the model executed by the coupler position determination module 326 is configured to start generating the estimated 3-dimensional position of the coupler at a medium distance and then reach maximum accuracy at very short distances.

In some embodiments, the coupler position determination module 326 determines which of the 3-dimensional visual landmarks belong to the coupler based on one or more of the following information: (1) 2-dimensional location of the coupler in an image of the video stream; (2) 3-dimensional coordinates of tracked visual landmarks predicted by the SLAM module 324; (3) descriptions of the image-space features corresponding to the tracked visual landmarks generated by the SLAM module 324; and/or (4) a bounding box around the coupler generated by the object detection module 322. In some embodiments, some points are selected within the bounding box. In some embodiments, it is assumed that remaining points within the bounding box have a high probability of belonging to the coupler. In some embodiments, a distance from the video camera may also be used to determine points belonging to the coupler. In some alternative embodiments, heuristic algorithms allowing determination of shapes and/or local point density may be used. In yet alternative embodiments, a machine learning model may be executed based on feature descriptions.

In some embodiments, the coupler position determination module 326 generates an estimation of a center of the coupler. In some embodiments, the model executed by the coupler position determination module 326 establishes a set of points (also referred to as "point cloud") belonging to the coupler that are then used to, at least partially, reconstruct a 3-dimensional model of the coupler. In some embodiments, the points of the set of points are fitted to a parametric model of a sphere or a hemisphere to then establish a position of the center of the coupler. In some embodiments, the reconstructed 3-dimensional model may be compared to a spherical shape to extract the position of the center of the coupler. In some embodiments, if at least some points of the set of points are nearly diametrically opposed points, then an estimation of the position of the center of the coupler may be calculated. In some embodiments, if at least some points belong to a same side of the coupler, then extrapolation to a full sphere may be conducted to estimate the position of the center of the coupler. In some embodiments, the extrapolation may be based on the Hough transform approach. In some embodiments, this may be done with a minimum of three points, if they belong to the hemisphere and based on an estimated value of a diameter of the sphere. In embodiments, if less than three points are determined as belonging to the coupler, then additional heuristic algorithms may be executed to extrapolate the position of the center of the coupler.

In some embodiments, the coupler position determination module 326 may be configured so as to operate on some but not all of the frames of the video stream. In such embodiments, an auxiliary/supporting model may be used to extrapolate between frames of the video stream. Extrapolation may be based on (1) an estimation of the video camera position; (2) the coupler position; and (3) a video camera displacement speed (i.e., the vehicle speed). An accurate video camera displacement speed may allow more precise prediction of a corresponding spatial displacement of the targets (e.g., the coupler). In some embodiments, if the predictions are sufficiently precise, then there may be no longer needs to update the SLAM module at a same time frames. Video camera displacement speed may be estimated in accordance with various approaches, such as, but not limited to, based on previous video camera poses (e.g., previous video camera positions and/or orientations) estimated by the SLAM module 324, data from the vehicle sensors and/or a fast visual odometry model (relying on neural network algorithms). Estimation of the video camera displacement speed may be improved based on Bayesian filtering, such as a Kalman filter or particle filter, or alternatively using a recurrent neural network. In some embodiments, the coupler position determination module 326 may be configured so as to operate a model dedicated to estimation at long distance. Such a model may rely on heuristic algorithms and/or neural network algorithms for depth estimation.

In some embodiments, the machine-learning module 330 may access the training model database 332 and/or additional source of data. In some embodiments, the machine-learning module 330 may be part of the object detection module 322, the SLAM module 324, the visual odometry module 325 and/or the coupler position determination module 326. In alternative embodiments, the machine-learning module 330 may be a distinct and/or autonomous software component exchanging data with the object detection module 322, the SLAM module 324, the visual odometry module 325 and/or the coupler position determination module 326 via an interface, e.g., an Application Programming Interface (API). In some embodiments, the machine-learning module 330 may implement one or more machine-learning algorithm so as to leverage newly acquired video streams with existing training models from the training model database 332. Examples of machine-learning algorithms implemented by the machine-learning module 330 may comprise, without being limitative, non-linear algorithm, linear regression, logistic regression, decision tree, support vector machine, naïve bayes, K-nearest neighbors, K-means, random forest, dimensionality reduction, neural network, gradient boosting, adaboost, lasso, elastic net, ridge, bayesian ridge, Automatic Relevance Determination (ARD) regression, Stochastic Gradient Descent (SGD) regressor, passive aggressive regressor, k-neighbors regressor and/or Support Vector Regression (SVR). In some embodiments, the training model database 332 may be implemented through database services such as, without being limitative, MySQL, PostgreSQL, MongoDB, MariaDB, Microsoft SQL Server, Oracle, Sybase, SAP HANA, MemSQL and/or IBM DB2. In some embodiments, machine-learning module 332 may continuously run algorithm training instances so as to improve efficiency of algorithms operated by the object detection module 322, the SLAM module 324 and/or the coupler position determination module 326.

Figure 4:
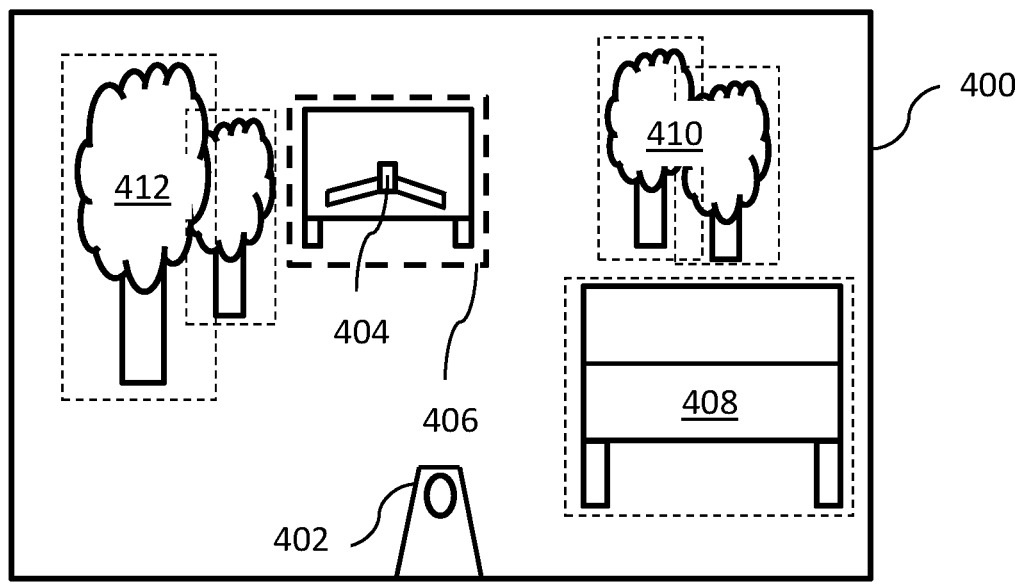
FIGS. 4-6 illustrate an embodiment of a method of detecting and tracking an object of interest in accordance with embodiments of the present technology.
Figure 4:
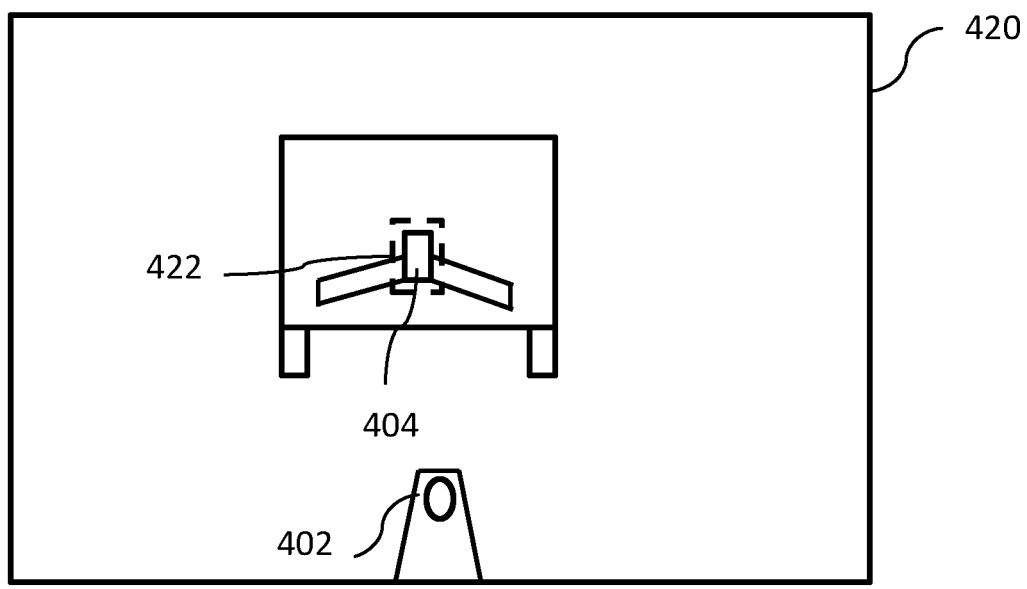
Figure 5:
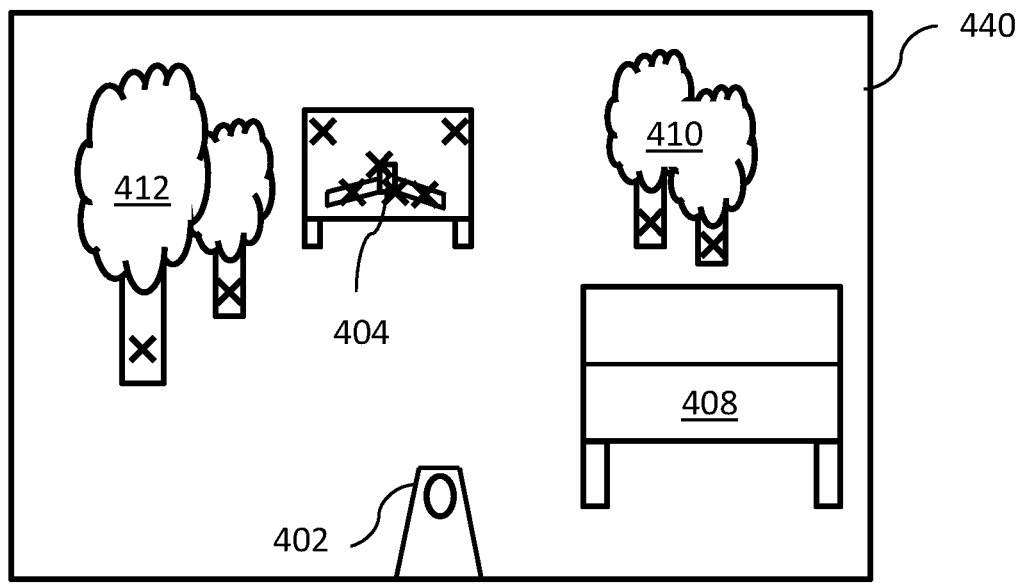
Figure 5:
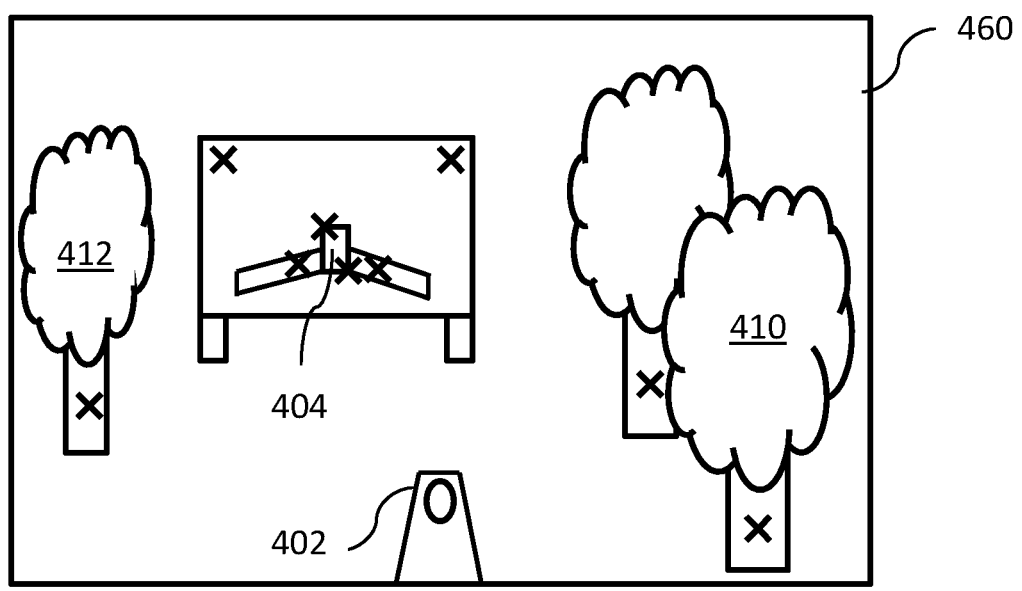
Figure 6:
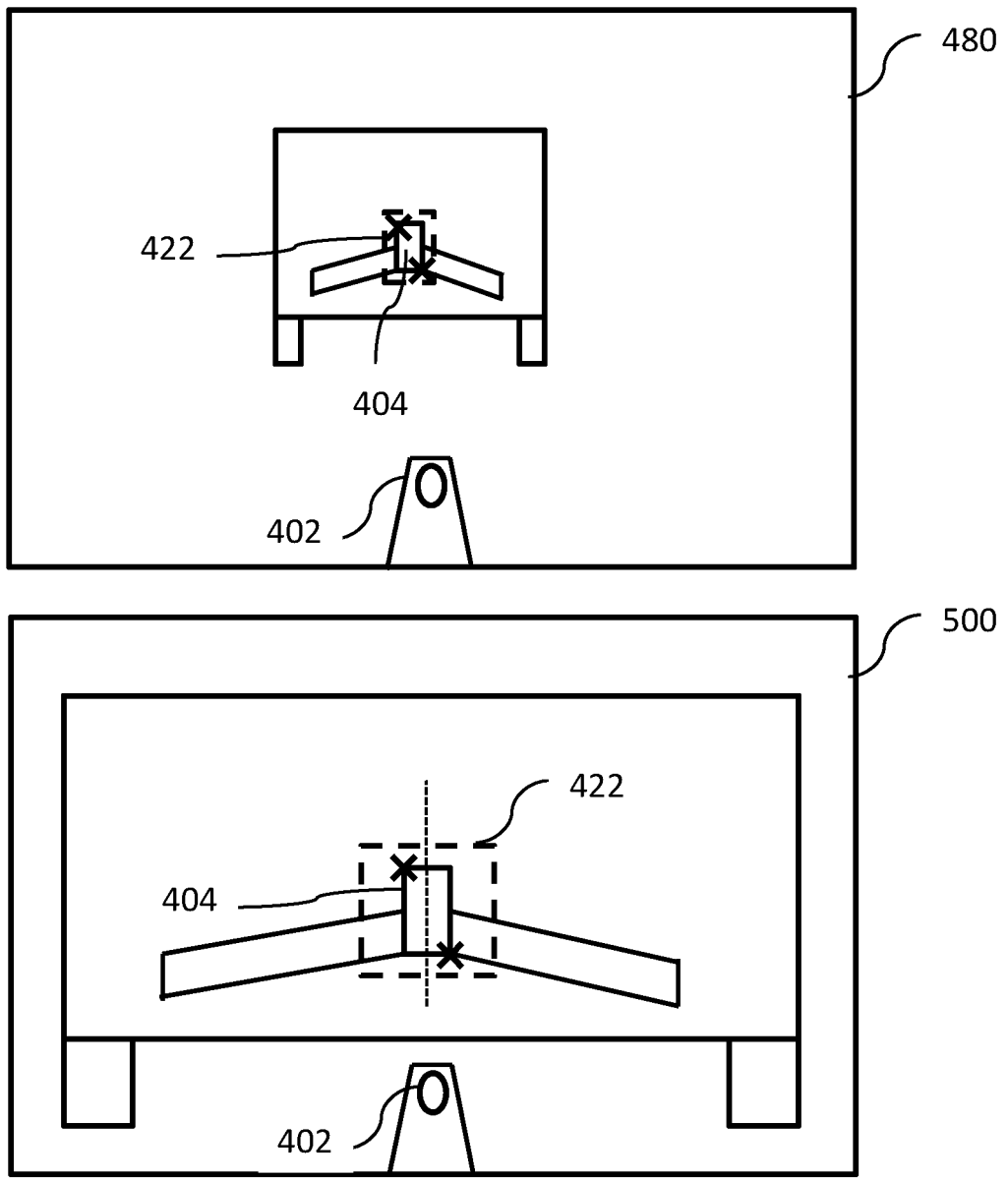

Turning now to FIG. 4-6, an exemplary embodiment of a method of detecting and tracking an object of interest, such as a coupler, will be described. Illustrations are provided as an example and should not be construed as being limitative. The examples of video feeds and/or augmented video feeds do not necessarily entail that they are intended to be presented to a driver/passenger of the vehicle, even though they could.

As it may be appreciated, even though the example of FIG. 4-6 is described in connection with the coupling of a vehicle and a trailer, it should be understood that other fields of applications are also envisioned, such as, detection and tracking of one or more objects of interest applied to the field of autonomous (or partially autonomous) vehicles and/or robotics or more generally to fields relying on integration of machine vision. Examples of autonomous or partially autonomous vehicles may comprise, without being limitative autonomous cars, autonomous trucks, unmanned aerial vehicles (e.g., drones), terrestrial mobile robots (e.g., autonomous ground vehicles (AGV) or legged robots). Other examples may be envisioned without departing from the scope of the present technology.

Through FIG. 4-6, multiple frames 400, 420, 440, 460, 480 and 500 of a video stream are depicted. The video stream may have been generated by a video camera, in this example, a video camera installed on a vehicle and oriented rearwardly with respect to the vehicle on which it is installed. As illustrated in frame 400, the video camera is oriented so as to have multiple objects in its field of view. The objects comprise background objects, such as trees 410 and 412 and a parked car 408. The objects also comprise an object of interest, in this example, a coupler 404 of a trailer. A hitch ball 402 extending rearwardly from the vehicle on which the video camera is installed is also visible.

In accordance with embodiments of the present technology, the method of detecting and tracking the object of interest executes detecting the object of interest (i.e., the coupler 404) from the background objects (i.e., the trees 410, 412 and the parked car 408) located in the field of view of the video camera. In the example, the method establishes a region of interest 406 associated with the trailer and a region of interest 422 associated with the coupler 404. Then, as illustrated in frames 440 and 460, multiple landmarks are being tracked (represented as an "x"). The 3-dimensional visual landmarks are associated with the object of interest and the background objects. At this step, a position of a referential point (e.g., a position of the video camera, a position of the hitch ball 402) and positions of the 3-dimensional visual landmarks may be generated. The positions may be 3-dimensional coordinates sharing a same referential system so that the positions of the 3-dimensional visual landmarks may be established with respect to the referential point.

As illustrated in frames 480 and 500, determination may be made that only some of the 3-dimensional visual landmarks relate to the object of interest, in this example, based on a determination that the 3-dimensional visual landmarks are located within the region of interest 422. Based on the selected sub-set of 3-dimensional visual landmarks, a position of the object of interest may be established.

Figure 7:
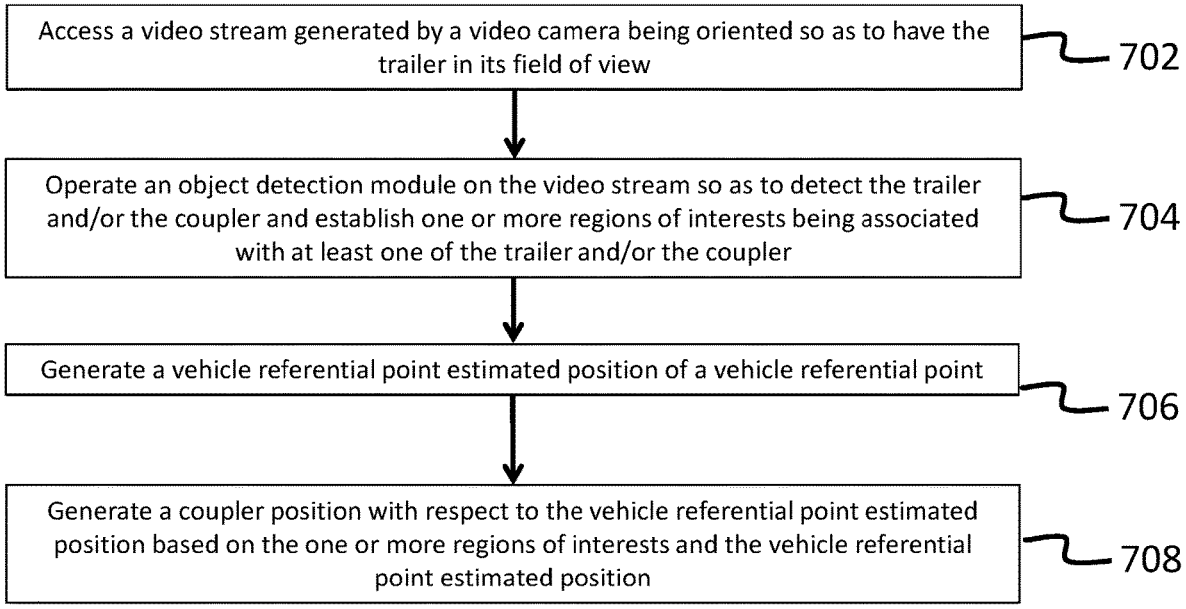
FIG. 7 is a diagram illustrating a flowchart illustrating a first computer-implemented method implementing embodiments of the present technology.

Turning now to FIG. 7, a flowchart illustrating a computer-implemented method 700 for detecting and tracking a coupler is illustrated. In some embodiments, the computer-implemented method 700 may be (completely or partially) implemented on a computing environment similar to the computing environment 100, such as, but not limited to, an embedded computer-implemented system of a vehicle.

The method 700 starts at step 702 by accessing a video stream generated by a video camera being oriented so as to have the trailer in its field of view.

Then, at step 704, the method 700 executes operating an object detection module on the video stream so as to detect the trailer and/or the coupler and establish one or more regions of interests being associated with at least one of the trailer and/or the coupler.

At step 706, the method 700 executes generating a vehicle referential point estimated position of a vehicle referential point. In some embodiments, generating the vehicle referential point estimated position is further based on tracked estimated positions of tracked landmarks, each one of the tracked landmarks being associated with an object located in the field of view of the video camera. In some embodiments, generating the vehicle referential point estimated position is further based on a dense depth map generated from the video stream. In some embodiments, generating the vehicle referential point estimated position comprises operating, on the video stream, one of a simultaneous localization and mapping (SLAM) module, a depth estimation model and/or a visual odometry module. In some embodiments, the vehicle referential point estimated position is associated with a map of an environment in the field of view of the video camera. In some embodiments, the map is generated as a set of 3-dimensional visual landmarks corresponding to a set of tracked image-space feature points.

At step 708, the method 700 executes generating a coupler position with respect to the vehicle referential point estimated position based on the one or more regions of interests and the vehicle referential point estimated position. In some embodiments, generating the coupler position with respect to the vehicle referential point estimated position is further based on the tracked landmarks estimated positions. In some embodiments, generating the coupler position with respect to the vehicle referential point comprises establishing which of the tracked landmarks belong to the trailer based on the one or more regions of interests established by the object detection module. In some embodiments, generating the position of the coupler with respect to the vehicle referential point is based on feature descriptions associated with the tracked landmarks. In some embodiments, generating the vehicle referential point estimated position and the tracked landmarks estimated positions (1) is operated on some but not all frames of the video stream and (2) comprises extrapolating remaining frames of the video stream. In some embodiments, generating the coupler position with respect to the vehicle referential point is executed on some but not all frames of the video stream and remaining frames of the video stream are extrapolated.

In some embodiments, the method 700 further comprises generating a user interface that comprises a visual representation of the position of the coupler with respect to a coupling component of the vehicle. In some embodiments, the visual representation is superimposed to the video stream.

In some embodiments, the vehicle comprises a propulsion system, a transmission system, a steering system and a brake system, and the method further comprises automatically controlling at least one the propulsion system, the transmission system, the steering system and/or the brake system based on the generated position of the coupler so as to align a trajectory of the coupling component of the vehicle with the coupler of the trailer.

In some embodiments, generating the coupler position with respect to the vehicle referential point is executed iteratively as the vehicle moves relative to the trailer. In some embodiments, generating the coupler position with respect to the vehicle referential point comprises determining a position of a center of the coupler.

Figure 8:
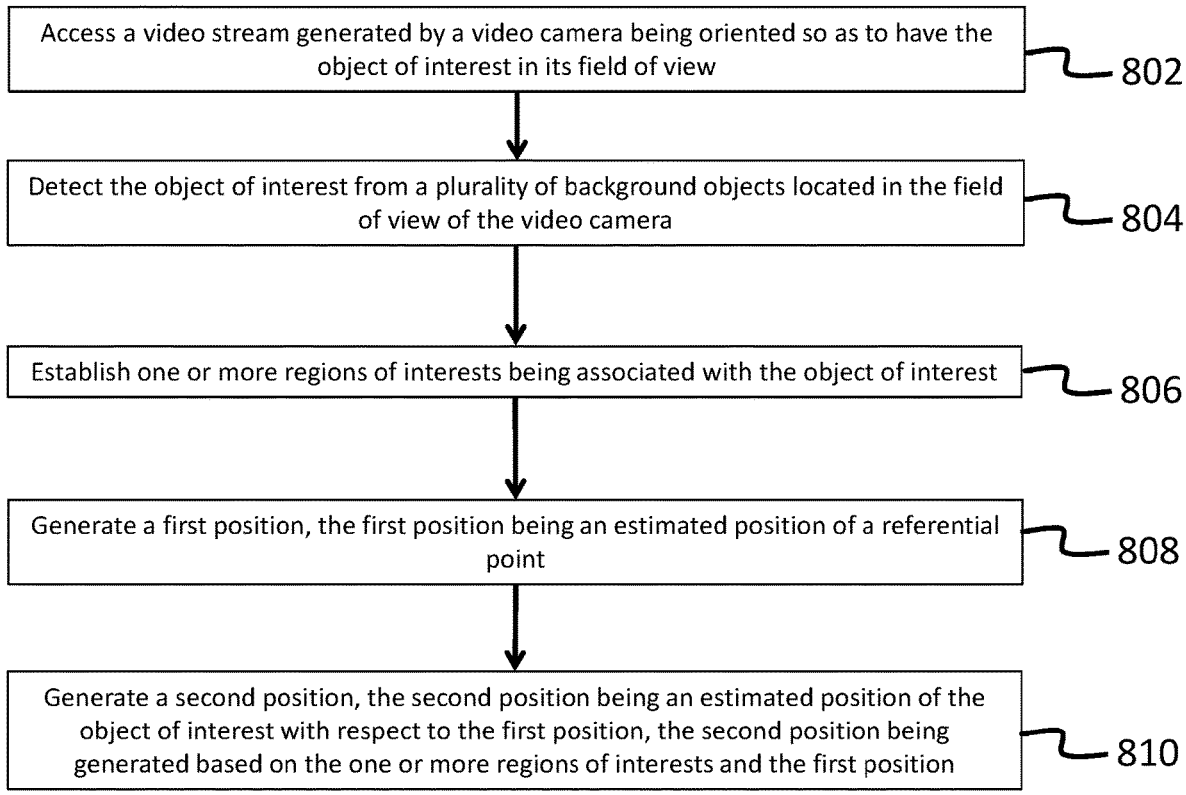
FIG. 8 is a diagram illustrating a flowchart illustrating a second computer-implemented method implementing embodiments of the present technology.

Turning now to FIG. 8, a flowchart illustrating a computer-implemented method 800 for detecting and tracking an object of interest is illustrated. In some embodiments, the computer-implemented method 800 may be (completely or partially) implemented on a computing environment similar to the computing environment 800, such as, but not limited to, an embedded computer-implemented system enabling machine vision.

The method 800 starts at step 802 by accessing a video stream generated by a video camera being oriented so as to have the object of interest in its field of view.

Then, at step 804, the method 800 executes detecting the object of interest from a plurality of background objects located in the field of view of the video camera.

At step 806, the method 800 executes establishing one or more regions of interests being associated with the object of interest.

At a step 808, the method 800 executes generating a first position, the first position being an estimated position of a referential point. In some embodiments, generating the first position is further based on tracked landmarks estimated positions of tracked landmarks, each one of the tracked landmarks being associated with the object of interest or the background objects. In some embodiments, the first position is associated with a map of an environment in the field of view of the video camera. In some embodiments, the map is generated as a set of 3-dimensional visual landmarks corresponding to a set of tracked image-space feature points.

Then, at step 810, the method 800 executes generating a second position, the second position being an estimated position of the object of interest with respect to the first position, the second position being generated based on the one or more regions of interests and the first position. In some embodiments, generating the second position with respect to the first position is further based on 3-dimensional visual landmarks estimated positions. In some embodiments, generating the second position with respect to the first position comprises operating, on the video stream, one of a simultaneous localization and mapping (SLAM) module, a depth estimation model and/or a visual odometry module. In some embodiments, generating the second position with respect to the first position comprises establishing which of the tracked landmarks belong to the object of interest based on the one or more regions of interests. In some embodiments, generating the first position and the tracked landmarks estimated positions (1) is operated on some but not all frames of the video stream and (2) comprises extrapolating remaining frames of the video stream. In some embodiments, generating the second position with respect to the first position is executed on some but not all frames of the video stream and remaining frames of the video stream are extrapolated.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for operating an embedded system of a vehicle during a coupling operation of the vehicle with a trailer having a coupler, the vehicle comprising a video camera, the method comprising:
   accessing a video stream generated by the video camera, wherein the video camera is oriented so as to have the trailer in its field of view;
   extracting object detection key frames from the video stream, wherein the object detection key frames comprise a subset of frames of the video stream;
   operating an object detection module on the object detection key frames so as to detect the trailer or the coupler and establish one or more regions of interest being associated with at least one of the trailer or the coupler, wherein the object detection module comprises one or more machine-learning algorithms;

propagating, based on a speed and direction of displacement of the vehicle, object detections from the object detection key frames to all frames of the video stream;

generating, based on tracked estimated positions of tracked landmarks, a vehicle referential point estimated position of a vehicle referential point on the vehicle, wherein each one of the tracked landmarks is associated with an object located in the field of view of the video camera; and generating a coupler position with respect to the vehicle referential point estimated position based on the one or more regions of interest and the vehicle referential point estimated position.

2. The method of claim 1, wherein generating the coupler position with respect to the vehicle referential point estimated position is further based on the tracked estimated positions of tracked landmarks.

3. The method of claim 1, wherein generating the coupler position with respect to the vehicle referential point estimated position comprises establishing which of the tracked landmarks are located on the trailer based on the one or more regions of interest established by the object detection module.

4. The method of claim 1, wherein generating the vehicle referential point estimated position is further based on a dense depth map generated from one or more depth sensors of the video camera.

5. The method of claim 1, wherein generating the vehicle referential point estimated position comprises operating, on the video stream, a simultaneous localization and mapping (SLAM) module configured to track a pose of the video camera generating the video stream and build a map of an environment using one or more visual cues from the video stream.

6. The method of claim 1, where the vehicle referential point estimated position is associated with a map of an environment in the field of view of the video camera, the map being a set of 3-dimensional visual landmarks corresponding to a set of tracked image-space feature points.

7. The method of claim 1, wherein generating the coupler position with respect to the vehicle referential point estimated position is executed on the object detection key frames and remaining frames of the video stream are extrapolated.

8. The method of claim 1, wherein the method further comprises rendering a visual representation of the position of the coupler with respect to a coupling component of the vehicle on a user interface, wherein the user interface comprises the video stream.

9. The method of claim 8, wherein the vehicle comprises a propulsion system, a transmission system, a steering system and a brake system, and the method further comprises automatically controlling at least one of the propulsion system, the transmission system, the steering system or the brake system based on the generated coupler position so as to align a trajectory of the coupling component of the vehicle with the coupler of the trailer.

10. The method of claim 1, wherein generating the coupler position with respect to the vehicle referential point estimated position is executed iteratively as the vehicle moves relative to the trailer.

11. The method of claim 1, wherein generating the coupler position with respect to the vehicle referential point comprises determining a position of a center of the coupler, wherein determining the position of the center of the coupler comprises:

determining a set of points associated with the coupler, and constructing, based on the set of points, a 3-dimensional model of the coupler.

12. The method of claim 1, wherein generating the vehicle referential point estimated position comprises operating, on the video stream, a depth estimation model.

13. The method of claim 1, wherein generating the vehicle referential point estimated position comprises operating, on the video stream, a visual odometry module configured to identify and track apparent motion of the tracked landmarks between frames of the video stream.

14. An embedded system of a vehicle configured to be operated during a coupling operation of the vehicle with a trailer having a coupler, the vehicle comprising a video camera, the embedded system comprising:

a processor;

a non-transitory computer-readable medium, the non-transitory computer-readable medium comprising control logic which, upon execution by the processor, causes:

accessing a video stream generated by the video camera, wherein the video camera is oriented so as to have the trailer in its field of view;

extracting object detection key frames from the video stream, wherein the object detection key frames comprise a subset of frames of the video stream;

operating an object detection module on the object detection key frames so as to detect the trailer or the coupler and establish one or more regions of interest being associated with at least one of the trailer or the coupler, the object detection module comprising one or more machine-learning algorithms;

propagating, based on a speed and direction of displacement of the vehicle, object detections from the object detection key frames to all frames of the video stream;

generating, based on tracked estimated positions of tracked landmarks, a vehicle referential point estimated position of a vehicle referential point on the vehicle, wherein each one of the tracked landmarks is associated with an object located in the field of view of the video camera; and generating a coupler position with respect to the vehicle referential point estimated position based on the one or more regions of interest and the vehicle referential point estimated position.

15. The embedded system of claim 14, wherein the control logic, upon execution by the processor, causes generating the vehicle referential point estimated position based on tracked estimated positions of tracked landmarks, each one of the tracked landmarks being associated with an object located in the field of view of the video camera.

16. The embedded system of claim 14, wherein the control logic, upon execution by the processor, causes generating the vehicle referential point estimated position based on a dense depth map generated from the video stream.

17. The embedded system of claim 14, wherein the vehicle comprises a propulsion system, a transmission system, a steering system and a brake system, and wherein the control logic, upon execution by the processor, causes automatically controlling at least one of the propulsion system, the transmission system, the steering system or the brake system based on the generated coupler position so as to align a trajectory of a coupling component of the vehicle with the coupler of the trailer.

\* \* \* \* \*